United States Patent [19]

Hares et al.

[11] 4,211,569

[45] Jul. 8, 1980

[54] HIGH INDEX OPHTHALMIC GLASSES

[75] Inventors: George B. Hares; David L. Morse, both of Corning, N.Y.

[73] Assignee: Corning Glass Works, Corning, N.Y.

[21] Appl. No.: 19,247

[22] Filed: Mar. 9, 1979

[51] Int. Cl.$^2$ .......................... C03C 3/10; C03C 3/30; C03C 3/08

[52] U.S. Cl. .................................... 106/53; 106/47 Q

[58] Field of Search ................................ 106/47 Q, 53

[56] References Cited

U.S. PATENT DOCUMENTS 3,973,976  8/1976  Boyd .................................. 106/47 Q Primary Examiner—O. R. Vertiz Assistant Examiner—Mark Bell Attorney, Agent, or Firm—Clinton S. Janes, Jr.

[57] ABSTRACT

This invention is concerned with the production of glasses suitable for use as segments in multifocal ophthalmic lenses and, especially, as segments in multifocal photochromic ophthalmic lenses. The glasses have refractive indices between about 1.58–1.71, softening points between 620°–645° C., strain points between 445°–480° C., coefficients of thermal expansion (0°–300° C.) between $60-66 \times 10^{-7}/°C.$, excellent chemical durability, and consist essentially, in weight percent on the oxide basis, of 0–2% $Li_2O$ and/or 0–3% $Na_2O$, 1–4% $Li_2O+Na_2O$, 4–9% BaO, 25–50% PbO, 4–8% $B_2O_3$, 4–7% $Al_2O_3$, 30–50% $SiO_2$, and 0.5–3% $TiO_2$.

6 Claims, No Drawings

HIGH INDEX OPHTHALMIC GLASSES

BACKGROUND OF THE INVENTION

It is well recognized in the ophthalmic glass art that multifocal lenses can be prepared by sealing one or more small segments or buttons of a glass having a high refractive index into a recess formed in a major lens blank molded from a crown glass. In the customary commercial practice, the major lens blank is fabricated from a spectacle crown glass having a refractive index of 1.523 and the segment or button glass has a higher refractive index, conventionally in the range of 1.58–1.71, the selection thereof being dependent upon the degree of visual correction required in the finished multifocal lens. Generally, the glass manufacturer will supply glasses of four refractive indices which encompass that range, those indices being about 1.58, 1.61, 1.65, and 1.70.

Ophthalmic lenses produced from photochromic glasses, or phototropic glasses as such have been variously termed, have recently been introduced into the marketplace. Such glasses are disclosed in U.S. Pat. No. 3,208,860, the basic patent in the field, as having the capability of darkening when subjected to actinic radiation, commonly radiation in the ultraviolet portion of the spectrum, and thereafter returning to their original optical transmission when removed from the incident radiation. Ophthalmic lenses, index-corrected to 1.523, have been marketed by Corning Glass Works, Corning, N.Y. under such registered trademarks as PHOTOGRAY and PHOTOSUN.

U.S. Pat. No. 3,973,976 observed that, until the time of that disclosure, photochromic ophthalmic lenses had been marketed as "single vision" lenses, i.e., as a single lens of photochromic glass having a refractive index of 1.523. Accordingly, there was a need for glasses with higher refractive indices, but which also exhibited the necessary chemical and physical characteristics for use as ophthalmic lenses and, very importantly, for sealing to the major lens blank. That patent explains that the sealing operation involves fusing the segment to the major lens blank. Consequently, the segment glass must possess a softening point, a strain point, and a coefficient of thermal expansion that closely match those properties of the major lens blank such that the seal resulting from the fusion step will manifest a very low stress level. U.S. Pat. No. 3,973,976 discloses and claims glass compositions of high refractive index which have the properties desired for opthalmic applications and can be fusion sealed to photochromic glasses of the type cited above marketed by Corning Glass Works under the designations Corning 8097 and 8098. Those glasses have softening points in the vicinity of 659°–675° C., strain points of about 469°–473° C., and a coefficient of thermal expansion over the range of 0°–300° C. of about $51 \times 10^{-7}/°$ C. Glasses disclosed as being suitable for use as segments for such photochromic lenses consisted essentially, in weight percent on the oxide basis, of 3–7% $B_2O_3$, 3–11% $Al_2O_3$, 30–60% PbO, and 27–55% $SiO_2$. Useful optional additions included up to 6% $La_2O_3$, up to 10% BaO, up to 3% $Li_2O$ and/or $Na_2O$, and up to 3% $TiO_2$. The sum of all additions to the base quaternary, however, was limited to no more than 10%. Those glasses were not photochromic in themselves but, because the segment constitutes only a small portion of the composite multifocal lens, it does not detract very substantially from the photochromic behavior furnished by the major lens blank.

Very recently, Corning Glass Works has marketed a new photochromic ophthalmic lens under the mark PHOTOGRAY EXTRA and given the designation Corning 8111. This glass, index-corrected to 1.523, is encompassed within U.S. application Ser. No. 14,981, filed Feb. 28, 1979 in the names of Hares, Morse, Seward, and Smith, and possesses a softening point of 662° C., a strain point of 468° C., and a coefficient of thermal expansion over the range of 0°–300° C. of 64. Because of the substantial difference in thermal expansion existing between the Corning 8111 glass and the Corning 8097 and 8098 glasses, different segment glasses for sealing thereto were obviously demanded to insure fusion seals of very low stress.

OBJECTIVE OF THE INVENTION

The primary objective of the present invention is to provide glasses having a refractive index between about 1.58–1.71, a softening point of 620°–645° C., a strain point between 445°–480° C., and a coefficient of thermal expansion (0°–300° C.) between $60–66 \times 10^{-7}/°C.$, along with the chemical and physical properties necessarily required of an ophthalmic glass, thereby recommending them as segments for multifocal photochromic lenses.

SUMMARY OF THE INVENTION

This objective can be achieved with glasses consisting essentially, expressed in weight percent on the oxide basis, of 0–2% $Li_2O$, 0–3% $Na_2O$, 1–4% $Li_2O + Na_2O$, 4–9% BaO, 25–50% PbO, 4–8% $B_2O_3$, 4–7% $Al_2O_3$, 30–50% $SiO_2$, and 0.5–3% $TiO_2$. Additions of up to 3% $La_2O_3$ and/or up to 2% $ZrO_2$ can be useful in raising the refractive index of the glass and improving its chemical durability.

PRIOR ART

U.S. Pat. No. 3,973,976 has been discussed in some detail above. The instant invention is an improvement upon that disclosure. A rather extensive review of the prior art was undertaken in that patent and those remarks plus the patents cited during the prosecution of that case are incorporated herein by reference.

DESCRIPTION OF PREFERRED EMBODIMENTS

Table I reports several glass compositions, expressed in parts by weight on the oxide basis, which are operable in the instant invention. Inasmuch as the total of the components closely approximates 100, for all practical purposes the values of the individual constituents can be deemed to reflect weight percent. The batch ingredients can consist of any materials, either the oxide or other compound, which, upon being melted together with the other components, will be converted into the desired oxide in the proper proportions. The batch constituents were compounded, ballmilled together to aid in securing a homogeneous melt, and then deposited into platinum crucibles. After covering, the crucibles were placed into a furnace operating at 1400°–1500° C. and the batches melted for 16 hours, with stirring. The melts were poured into steel molds to produce square glass slabs about $6 \times 6 \times \frac{1}{2}$ inches and the slabs were transferred immediately to an annealer operating at about 550° C.

Arsenic oxide and antimony oxide were employed in their conventional utility as fining agents. However, other fining agents known to the glassmaking art could be substituted therefor.

|  | 1 | 2 | 3 | 4 |
|---|---|---|---|---|
| $SiO_2$ | 46.38 | 40.60 | 35.62 | 31.27 |
| PbO | 27.19 | 35.80 | 44.40 | 44.42 |
| $B_2O_3$ | 7.30 | 6.60 | 5.93 | 5.36 |
| $Al_2O_3$ | 6.39 | 6.20 | 6.00 | 4.65 |
| BaO | 8.00 | 6.50 | 5.00 | 8.00 |
| $Na_2O$ | 2.65 | 2.10 | 1.50 | 0.95 |
| $Li_2O$ | 1.24 | 0.70 | 0.15 | 0.15 |
| $TiO_2$ | 0.60 | 0.87 | 1.15 | 2.80 |
| $La_2O_3$ | — | — | — | 1.65 |
| $ZrO_2$ | — | — | — | 0.50 |
| $Sb_2O_3$ | 0.10 | 0.2 | 0.10 | 0.10 |
| $As_2O_3$ | 0.15 | 0.2 | 0.15 | 0.15 |

Table II records the standard viscosity-temperature measurements of softening point (Soft. Pt.), annealing point (Ann. Pt.), and strain point (Str. Pt.) in °C. for each glass of Table I, along with values of the refractive index ($n_D$), coefficient of thermal expansion (Exp.) over the range of 0°–300° C. ($\times 10^{-7}/°C$.), the dispersion (Disp.), and the seal stress (Stress) to Corning 8111 photochromic glass in °C.

Table II also includes a measure of the chemical durability exhibited by the glasses as defined in terms of weight loss (Wt. Loss) in mg/cm$^2$ and in terms of visual appearance. Thus, the chemical durability of the glasses was evaluated employing a test method recognized as standard in the ophthalmic industry, viz., the AO test. The procedure involves five general steps. First, the surface area of a glass sample (normally polished) is carefully measured. Second, the sample is weighed. Third, the sample is immersed into a 10% by weight aqueous solution of hydrochloric acid (HCl) for 10 minutes at a temperature of 25° C. Fourth, the sample is withdrawn from the solution, washed with distilled water, and dried. Fifth, the sample is reweighed and the difference in weight calculated as weight loss in mg/cm$^2$ of sample surface. The surface of the sample is examined visually to observe the presence of iridescence, haze, or other surface imperfection.

A weight loss of not in excess of 0.03 mg/cm$^2$ and no visible surface defect are required to successfully pass the test. Accordingly, N.C. indicates no change in visual appearance (Appear.).

TABLE II

|  | 1 | 2 | 3 | 4 |
|---|---|---|---|---|
| Soft. Pt. | 638 | 632 | 628 | 631 |
| Ann. Pt. | 484 | 486 | 482 | 500 |
| Str. Pt. | 454 | 454 | 450 | 470 |
| Exp. | 61.8 | 61.3 | 62 | 65.6 |
| Disp. | 45.13 | 40.50 | 36.32 | 32.87 |
| Stress | 7 | 6 | 4 | 15 |
| Wt. Loss | <0.01 | <0.01 | <0.01 | 0.01 |
| Appear. | N.C. | N.C. | N.C. | N.C. |
| $n_D$ | 1.58900 | 1.61798 | 1.65272 | 1.70201 |

A study of Table II evidences the utility of Examples 1–4 for ophthalmic elements. Thus, each glass provides an index step which, coupled with the melting and forming behavior and the chemical and physical properties exhibited by each, recommends them as preferred compositions for segments in multifocal ophthalmic lenses.

The composition ranges useful for the present inventive glasses are very critical in scope to secure the desired chemical and physical properties. Even minor modifications in composition can affect the viscosity-temperature relationship, the thermal expansion, the chemical durability, etc. of the glass to such an extent as to render it useless for the purpose required. Moreover, the total of all components outside of the base $Li_2O$ and/or $Na_2O$-BaO-PbO-$B_2O_3$-$Al_2O_3$-$SiO_2$-$TiO_2$ system will not exceed 5%.

We claim:

1. An ophthalmic glass having a refractive index between about 1.58–1.71, a softening point between 620°–645° C., a strain point between 445°–480° C., a coefficient of thermal expansion (0°–300° C.) between 61.3–65.6×10$^{-7}$/°C., and a weight loss of no more than 0.03 mg/cm$^2$ with no visible surface imperfection after immersion into a 10% by weight aqueous solution of HCl for 10 minutes at 25° C., said glass consisting essentially, in weight percent on the oxide basis, of 0–2% $Li_2O$, 0–3% $Na_2O$, 1–4% $Li_2O$+$Na_2O$, 4–9% BaO, 25–50% PbO, 4–8% $B_2O_3$, 4–7% $Al_2O_3$, 30–50% $SiO_2$, and 0.5–3% $TiO_2$, the sum of those constituents constituting at least 95% by weight of the total composition.

2. A glass according to claim 1 also containing up to 3% $La_2O_3$ and/or up to 2% $ZrO_2$.

3. A glass according to claim 1 having a coefficient of expansion of 61.8×10$^{-7}$/°C. with the following approximate composition in parts by weight on the oxide basis:

| $SiO_2$ | 46.38 |
|---|---|
| PbO | 27.19 |
| $B_2O_3$ | 7.30 |
| $Al_2O_3$ | 6.39 |
| BaO | 8.00 |
| $Na_2O$ | 2.65 |
| $Li_2O$ | 1.24 |
| $TiO_2$ | 0.60 |
| $Sb_2O_3$ | 0.10 |
| $As_2O_3$ | 0.15 |

4. A glass according to claim 1 having a coefficient of expansion of 61.3×10$^{-7}$/°C. with approximate composition in parts by weight on the oxide basis:

| $SiO_2$ | 40.60 |
|---|---|
| PbO | 35.80 |
| $B_2O_3$ | 6.60 |
| $Al_2O_3$ | 6.20 |
| BaO | 6.50 |
| $Na_2O$ | 2.10 |
| $Li_2O$ | 0.70 |
| $TiO_2$ | 0.87 |
| $Sb_2O_3$ | 0.2 |
| $As_2O_3$ | 0.2 |

5. A glass according to claim 1 having a coefficient of expansion of 62×10$^{-7}$/°C. with the following approximate composition in parts by weight on the oxide basis:

| $SiO_2$ | 35.62 |
|---|---|
| PbO | 44.40 |
| $B_2O_3$ | 5.93 |
| $Al_2O_3$ | 6.00 |
| BaO | 5.00 |
| $Na_2O$ | 1.50 |
| $Li_2O$ | 0.15 |
| $TiO_2$ | 1.15 |
| $Sb_2O_3$ | 0.10 |

| -continued | |
|---|---|
| $As_2O_3$ | 0.15 |

6. A glass according to claim 1 having a coefficient of expansion of $65.6 \times 10^{-7}/°C.$ with the following approximate composition in parts by weight on the oxide basis:

| | |
|---|---|
| $SiO_2$ | 31.27 |

| -continued | |
|---|---|
| PbO | 44.42 |
| $B_2O_3$ | 5.36 |
| $Al_2O_3$ | 4.65 |
| BaO | 8.00 |
| $Na_2O$ | 0.95 |
| $Li_2O$ | 0.15 |
| $TiO_2$ | 2.80 |
| $La_2O_3$ | 1.65 |
| $ZrO_2$ | 0.50 |
| $Sb_2O_3$ | 0.10 |
| $As_2O_3$ | 0.15 |

* * * * *

UNITED STATES PATENT AND TRADEMARK OFFICE
CERTIFICATE OF CORRECTION

PATENT NO. : 4,211,569
DATED : July 8, 1980
INVENTOR(S) : George B. Hares and David L. Morse It is certified that error appears in the above-identified patent and that said Letters Patent are hereby corrected as shown below:

Column 4, line 41, add --the following-- after "with".

Signed and Sealed this

Twentieth Day of January 1981

[SEAL]

Attest:

Attesting Officer

RENE D. TEGTMEYER

Acting Commissioner of Patents and Trademarks